Feb. 23, 1937. D. W. RANDOLPH ET AL 2,071,573
IGNITION SYSTEM
Filed May 28, 1934 3 Sheets-Sheet 1
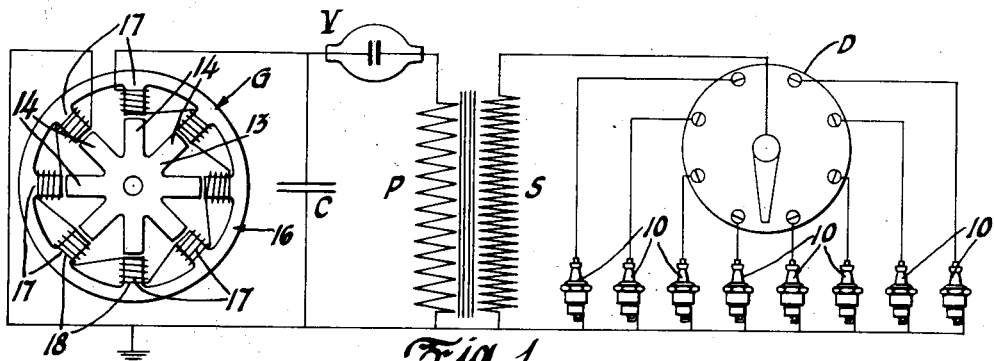
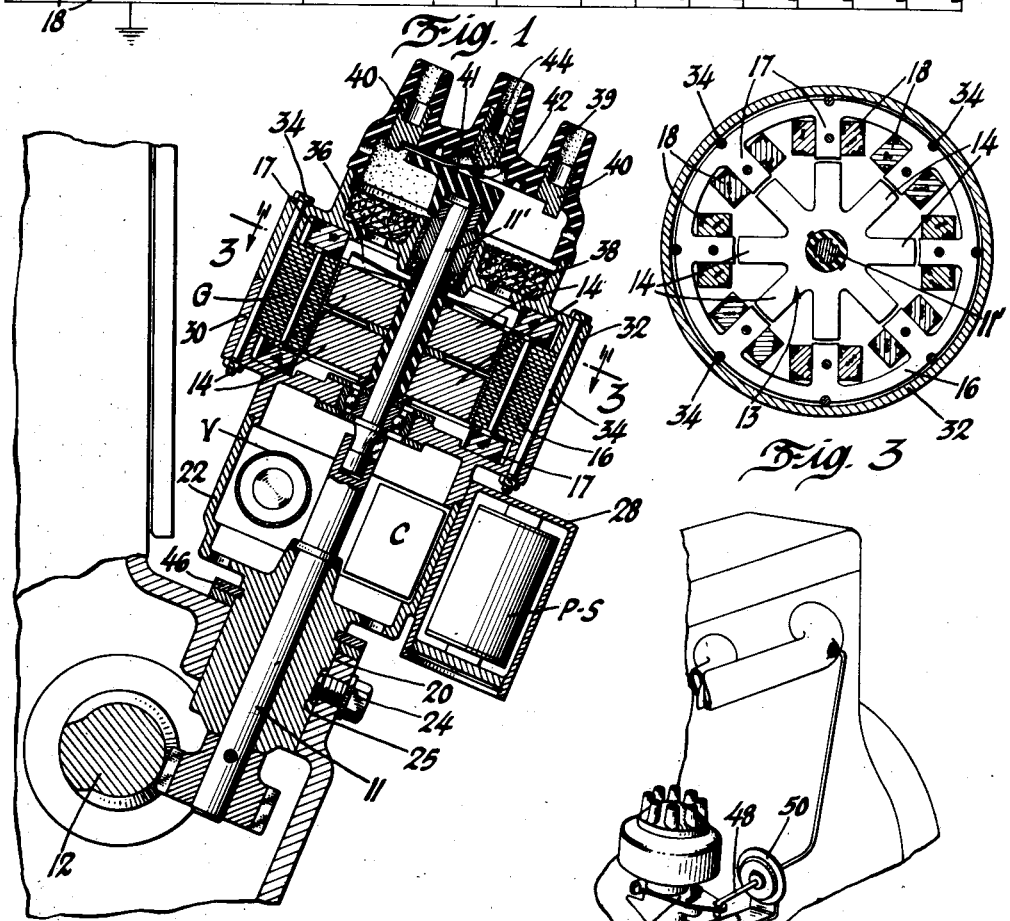
Inventors
Hector Rabezzana &
Donald W. Randolph
By Blackmore, Spencer & Flint
Attorneys Inventors
Hector Rabezzana &
Donald W. Randolph
By Blackmore, Spencer & Flint
Attorneys Feb. 23, 1937. D. W. RANDOLPH ET AL 2,071,573
IGNITION SYSTEM
Filed May 28, 1934 3 Sheets-Sheet 3
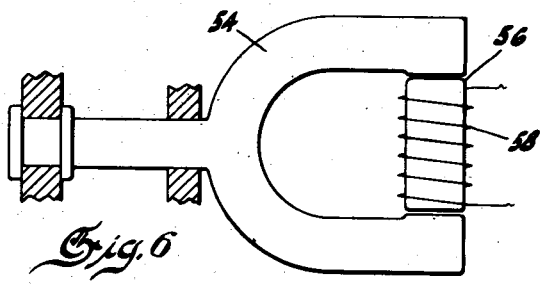
Fig. 6
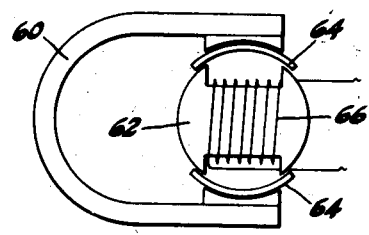
Fig. 7
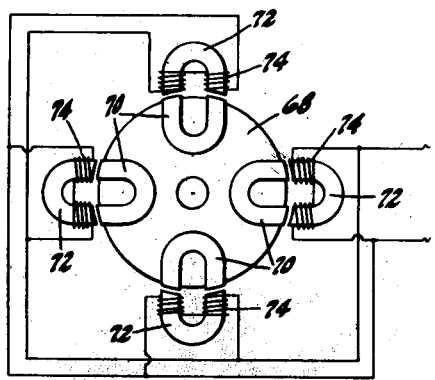
Fig. 8
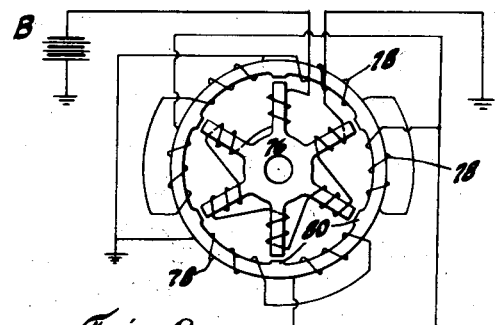
Fig. 9
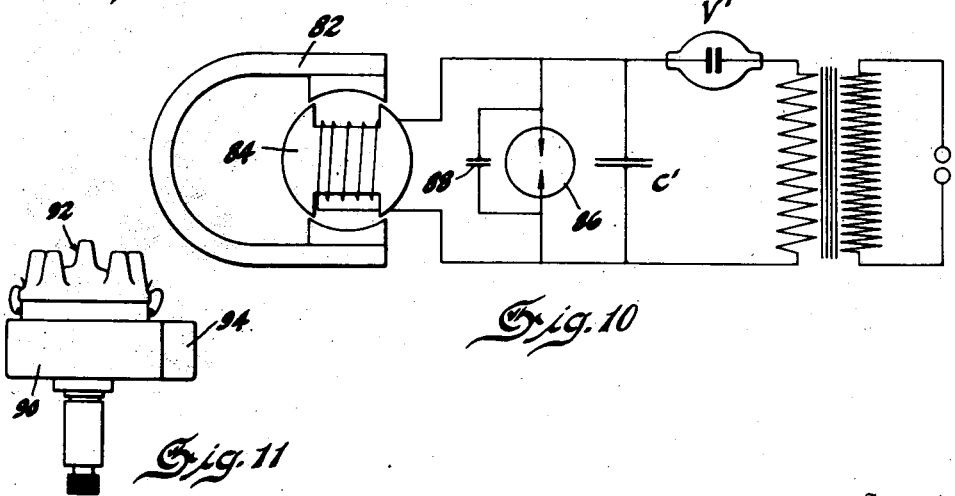
Fig. 10
Fig. 11
Inventors
Hector Rabezzana &
Donald W. Randolph
By Blackmore, Spencer & Flint
Attorneys Patented Feb. 23, 1937

2,071,573

UNITED STATES PATENT OFFICE 2,071,573

IGNITION SYSTEM

Donald W. Randolph and Hector Rabezzana, Flint, Mich., assignors to General Motors Corporation, Detroit, Mich., a corporation of Delaware Application May 28, 1934, Serial No. 727,888

18 Claims. (Cl. 123—148)

This invention has to do with ignition systems and is an improvement on the system described and claimed in the prior application of Duffendack, Randolph and Wolfe, S. N. 668,754, filed May 1, 1933.

In that application there is disclosed an ignition system including a source of electrical energy arranged in series with an inductance and an interrupter. To this circuit a condenser is connected, preferably in parallel with the interrupter, so as to receive a surge of energy when the circuit is broken at the interrupter. This energy is supplied chiefly by the magnetic field of the inductance. When the condenser attains a predetermined voltage it discharges through an electrical valve arranged in a circuit coupled to the spark plug circuit preferably by means of an air core step-up transformer. The valve is preferably in the form of a two electrode gaseous discharge tube such as is described and claimed in the prior application of Duffendack and Wolfe, S. N. 668,753, filed May 1, 1933, and thereafter refiled on March 23, 1934 under S. N. 716,972. The valve is characterized by the fact that when the voltage applied to it attains a predetermined value the gap between the electrodes suddenly breaks down and becomes conducting and offers practically no resistance to the passage of current. The discharge current through the tube is consequently of high value. Sudden passage of this heavy surge of current through the primary of the transformer results in the production of sparks at the spark plug. A conventional distributor in the secondary circuit determines the plug at which discharge takes place.

It is a characteristic of this system that the discharge consists of a succession of sparks of very short duration. In other words, the discharge is of very high frequency. The period of time during which the plug is subjected to voltage sufficient to cause a spark is so slight that there can be no important leakage of current through paths in parallel with the spark plug gap such as are often provided by conducting deposits of carbon on the insulator. Consequently the system will continue to function long after conventional systems would be put out of operation by short circuiting of the plugs through fouling.

According to our invention the above described circuit is simplified and improved by combining the functions of the source of electrical energy and inductance in a simple generator either of the magneto or electro-magnetic type.

We have further found that by employing a generator having suitable operating characteristics it is possible to dispense with the interrupter thereby doing away with the serious problem of destruction of the contact points resulting from sparking and wear. This is one of the most serious problems in connection with modern ignition systems.

We have found it most convenient to drive the generator directly from the usual distributor shaft. Since the distributor shaft is driven at half engine speed it is but necessary to provide the generator with as many poles as the engine has cylinders. Each alternation can be used to produce a spark thereby making unnecessary the use of commutators or the like. The alternating character of the discharge has the advantage that the direction of discharge in the electric valve is reversed with each spark so that the wear on the electrodes is equalized and there is no building up of one electrode at the expense of the other, such action sometimes resulting in bridging of the gap.

We have likewise found it possible to support our entire ignition unit entirely on the distributor shaft and housing, thereby achieving a very compact and simple assembly.

In the drawings:

Figure 1 illustrates diagrammatically the preferred form of ignition system.

Figure 2 is a view, partly in section showing the manner of driving the generator from the engine, and the method of mounting the other parts of the system.

Figure 3 is a section on line 3—3 of Figure 2.

Figure 4 is a view showing the application of intake manifold suction control to the generator of Figure 2.

Figures 6, 7 and 8 are diagrammatic views showing modifications of a generator of the magneto type.

Figure 9 is a diagrammatic view showing an electro-magnetic type of generator that may be employed.

Figure 10 shows a modified form of ignition circuit.

Figure 11 shows a modified mounting for the ignition system.

Figure 5:
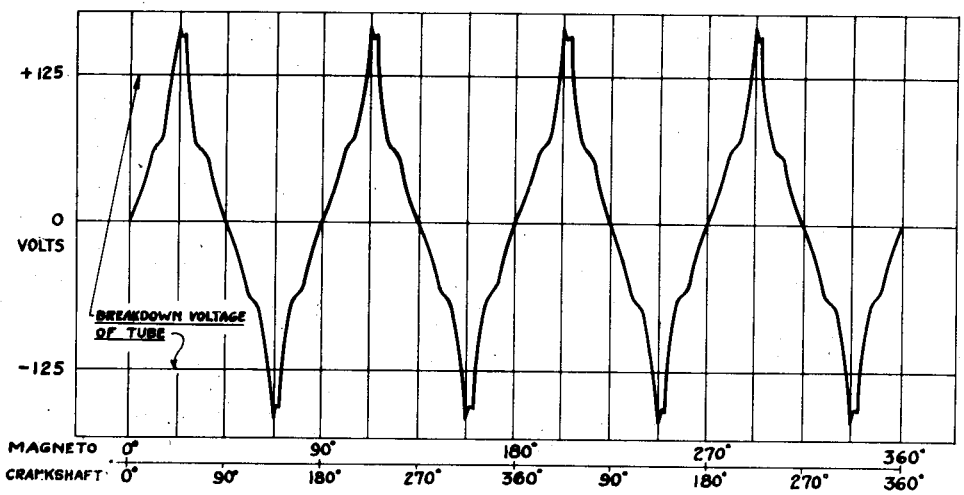
Figure 5 illustrates the voltage wave produced by one rotation of the generator of Figure 2.

The ignition system shown in Figure 1 consists of a generator G, a condenser C connected across the terminals of the generator and an electric valve V and primary P of a transformer, the valve and primary being arranged in series across the condenser. The secondary S of the transformer is arranged in series with distributor D supplying current to the spark plugs 10.

The circuit is similar to that disclosed in the prior application of Duffendack, Randolph and Wolfe, S. N. 668,754, filed May 1, 1933 in that means is provided to supply an electric charge to the condenser C, and when this charge builds up to a predetermined voltage the gap in the valve V breaks down, permitting a sudden surge of current to pass through the primary P of the transformer; this in turn produces a similar surge but at higher voltage in the secondary S resulting in discharge at the plugs, the order of discharge being determined as usual by the distributor D.

According to our invention the charge applied to the system to produce discharge at the plugs is obtained directly from a suitable engine driven generator, preferably without the employment of a circuit breaker such as is disclosed in the prior case. To accomplish this, the generator must be of such design and so synchronized with the engine as to supply, in the conventional four cycle engine, a surge of energy to each spark plug once during every two revolutions of the crankshaft. Synchronization may be achieved by driving the generator from the crankshaft by means of reduction gearing so that the generator is rotated at half crankshaft speed. In Figure 2 we have shown the shaft 11 of the generator driven by one to one gearing from the camshaft 12, which, in turn, is driven at half crankshaft speed by the usual timing gears. The design of generator shown in Figures 1 to 3 will be found to be very satisfactory as well as economical to manufacture. The generator there illustrated is designed for use with an eight cylinder engine and consists of a rotor 13 in the form of a permanent magnet having four pairs of poles 14, the poles, of course, being alternately north and south. We have shown the rotating magnet made in two parts, axially separated as shown in Figure 2, both parts being keyed to the shaft 11 for rotation therewith. It is preferable to make the magnet in two parts to obtain better cooling. The stator 16 is laminated as usual and is in the form of a ring provided with eight pole pieces 17 having windings 18 thereon as shown. These windings are so arranged that the voltages induced in them are cumulative.

The rotor is preferably made of magnetic material of high coercive force. We have employed with success rotors made of commercial cobalt steel alloys and the use of even newer aluminum iron alloys is indicated as desirable. The stator 16 may be conveniently made of laminated transformer steel.

While the generator is illustrated diagrammatically in Figure 1, Figures 2 and 3 show details of construction. It will be noted that shaft 11 is journaled in bearing 20 formed in the lower end of a housing 22. The housing 22 is locked against axial movement by set screw 24 which is received in arcuate slot 25 in bearing 20, the slot permitting limited arcuate movement of the housing and connected parts. In the housing 22 is arranged in any convenient manner the electrical valve V and condenser C. The transformer P—S is preferably housed in a separate casing 28 which may be bolted to the housing 22. The valve, condenser, transformer and generator are, of course, electrically connected as shown in Figure 1.

Drive shaft 11 is preferably made in two separable sections as shown in Figure 2 to permit removal of the generator and distributor to afford access to the parts in the housing 22. The upper part 11' of the drive shaft 11 is journaled at its lower end in a suitable bearing carried by housing section 30 which may be bolted or otherwise secured to the housing 22. The upper end of shaft section 11' is journaled in a suitable bearing carried by housing section 32. The housing made up of sections 30 and 32 is adapted to receive the stator 16 of the generator, the parts of the housing being secured together by bolts 34. A fan 36 is secured to shaft 11' within the housing 30—32. Housing section 32 is recessed on its upper side to receive filtering material 38, for filtering the air circulated through the generator housing by the fan 36. To the top of the housing section 32 is removably secured in the usual manner the distributor cap 39 provided with contacts 40 for connection by suitable leads, not shown, to the spark plugs. To the top of shaft section 11' is secured the rotary contact carrier 41 of the distributor, carrying contact plate 42, one end of which is always in engagement with contact 44, connected by a suitable conductor, not shown, with the secondary S of transformer P—S. The other end of contact plate 42 is adapted to be brought successively into electrical connection with contacts 40. It is preferable that this be accomplished without actual rubbing contact, there always being a slight space between the cooperating contacts as shown.

With the described construction it will be noted that the parts 22, 30 and 32 form one connected housing assembly and that by rotating this assembly the position of the stator 16 of the generator G may be shifted with respect to the rotor to vary the timing of the spark. We have illustrated in Figure 4 provision for control of timing in accordance with manifold suction. Arm 46 rigidly secured to the housing assembly is connected by a suitable link 48 to diaphragm 50, the other side of which is subjected to intake manifold suction as shown. Obviously, the parts will be arranged so that as the suction increases the housing assembly will be rotated in a direction to advance the time of sparking, while as the suction decreases the housing assembly will be rotated in the opposite direction to retard the time of sparking.

In the above detailed description we have set forth one specific arrangement of parts that we have found to be convenient but it will be understood that our invention is capable of many different embodiments. None of the parts of our ignition system take up much room. The compactness and small weight of this type of generator gives it especial advantage in connection with automobile design where it is often difficult to find room for accessory devices.

The generator described will provide eight alternations during each revolution of the rotor 13. In Figure 5 there is shown the type of voltage wave produced during one revolution of the generator G and also the approximate voltage at which the gap between the electrodes of the valve V is broken down. This break down voltage is determined by the design of the valve, and for details of the valve design reference is made to the copending application of Duffendack and Wolfe, S. N. 716,792, filed March 23, 1934. As described in said application the preferred form of tube consists of electrodes both of which are preferably formed of low work function material, such as nickel-copper-barium alloy containing on the order of 1% to 5% barium, in an atmosphere of inert gas, preferably consisting chiefly of neon with small additions of argon and mercury, the factors of tube design, particularly the gas pressure, being so selected as to permit discharge between the electrodes when a voltage in the neighborhood of 115 to 120 volts is applied to them.

The condenser C performs the important function of storing the energy produced by the generator until a sufficient voltage has been attained to produce discharge in the valve. The condenser should be large enough to hold a sufficient charge so that when this stored energy is added to the energy instantaneously supplied by the generator at the time of break down of the valve, there will be ample for the discharge at the plug under all conditions of operation. The capacity of the condenser will vary in accordance with other factors of design, but we have found capacitance in the neighborhood of one microfarad to be satisfactory.

The transformer indicated at P—S may either have an iron core or an air core, although the former is preferable. Where an iron core transformer is employed we have obtained good results employing on the order of twenty turns for the primary and on the order of three thousand turns for the secondary. The high secondary voltage is essential to produce sparking at the plug. In modern engines the voltage required to produce sparking at the plugs is of the order of 4,000 to 7,000 volts. We have found it desirable to keep down the impedance of the tube circuit as low as possible, and for that reason have employed a very small number of turns on the primary. The low impedance is desirable in order to obtain surges of current of high value through the circuit. While it might seem desirable to obtain minimum impedance by employing tuned circuits in both primary and secondary, as a practical matter owing to so many variable factors, such as differences in capacitance of leads going to the plugs, we have found that it is apparently not desirable.

It will be understood that the transformer P—S between the tube circuit and the spark plug circuit is simply one form of coupling and the use of other kinds of coupling is indicated. However, our studies indicate that inductive coupling is by far the best from the practical standpoint, and has the important advantage of providing the higher voltages needed to produce discharge at the plugs.

In the operation of the system each time one of the poles of the magnet passes from a position midway between one pair of field poles to a position between the next pair of field poles it will have generated voltage having a wave form such as is indicated by one of the alternations in Fig. 5. It will be understood that this wave form has been selected because it is especially desirable in this ignition system, but that by the application of the usual principles of design of electrical machinery other wave forms may be produced. We have found it especially desirable to obtain a sharply peaked wave so as to accurately control the time at which the break down voltage of the tube is attained.

The energy produced by rotation of the generator is stored in the condenser C until the generated voltage reaches the break down value of the valve V whereupon discharge takes place between the valve electrodes and through the primary P of the transformer as previously described. This discharge is of very high frequency, consisting really of a series of discharges in the same direction. Each discharge persists for a very short time. On each discharge the current may attain a value of from eighty to one hundred amperes. These rapid surges of current produce corresponding high frequency discharge at the plugs in the secondary circuit, and as a consequence the plugs are comparatively free from the effects ordinarily produced by fouling, the discharges being of such short duration that there is not time enough for any substantial flow of energy through the paths provided by coatings of carbon and the like on the plugs.

An important advantage of our system consists in the elimination of breaker points. These points are subject to rapid disintegration as a result of electrical discharge between them, and are a constant source of trouble and annoyance. By designing and driving the generator so that it supplies the desired break down voltage at approximately the time desired, it is possible to do away with circuit breakers.

It will be apparent that the design of the generator may be greatly varied. Almost any of the known forms of generators producing peaked voltage wave may be employed to give the desired impulse to the circuit. We have preferred to employ alternators with permanent magnets to avoid the complication of slip rings, commutators and battery connections, and to reduce the generator to the smallest possible dimensions. We have illustrated in Figures 6 to 8 some alternate forms of generators that may be of value in certain installations.

In Figure 6 a permanent magnet 54 of horseshoe shape straddles stator 56 in the form of an iron core having a winding 58, the terminals of which are connected to the circuit in the same way as the terminals of the generator of Figure 1. Provision is made for rotating magnet 54 by any suitable driving means.

In Figure 7 both the permanent magnet 60 and the stator 62 are stationary. Between the two is a revolving magnetic shunt in the form of two arcuate members 64 suitably connected to rotate together. Members 64 are at times in the position shown, reducing the reluctance of the magnetic circuit between the poles of the magnet and the ends of the stator 62. Upon rotating another 45° the members 64 form paths of low reluctance diverting flux through the winding 66 on the stator 62. These variations in flux through the windings of the pole piece produce the desired voltage wave for the ignition circuit.

In Figure 8 there is illustrated a form of generator similar to that at one time used on Ford cars. Here the part 68 may be a flywheel carrying pairs of permanent magnets 70. With the magnets cooperate the stationary pole pieces 72 of U shape as shown and provided with windings 74. As shown on the drawings the windings of each pole piece 72 are arranged in series, but in parallel with the windings of the other pole pieces. In practice it may be preferable to arrange all of the windings in series to provide a higher generated voltage.

The generator shown in Figure 9 is similar to that shown in Figure 1, except that the rotor 76 comprises electro-magnets supplied with current from battery B. This, of course, makes it necessary to employ slip rings, not shown. Another difference resides in the fact that the windings 78 on the stator are between the pole pieces 80 instead of encircling them. In this figure also the stator windings are connected to the line in pairs so that the generated voltage is much lower than that produced by the generator of Figure 1 in which all windings are in series.

In Figure 10 there is shown a modification of circuit in which the generator consisting of permanent magnet 82 and wound rotor 84 supplies current to a circuit identical with that shown in Figure 1 except that a mechanical circuit breaker 86, operated either by the generator or by the engine, is arranged in parallel with the condenser C'. The circuit breaker is preferably bridged by a small condenser 88 to reduce the effects of the sparking on the points. Breaker 86 is timed to break the circuit just before the spark is desired at the plug and preferably also when the generated voltage is a maximum. Breaking of the circuit at the breaker 86 results in charging of the condenser C' and when the charge on the condenser reaches the break down voltage of the valve V' a surge of current flows through the tube circuit producing discharge at the plugs in the secondary in the manner previously described. Obviously, a circuit breaker may be employed with the circuit of Figure 1 if desired and with any type of generator that may be employed. However the use of a circuit breaker is to be avoided if possible because of the trouble arising from wear on the breaker points.

In Figure 11 we have shown a further modification of the mounting of the generator and other parts of the ignition system. Here the generator is contained within housing 90 and is driven as before from the shaft that drives the distributor 92. The electrical valve, condenser and coil are contained within housing 94 attached to the side of the generator. This construction permits reducing the length of the assembly.

Figure 12:
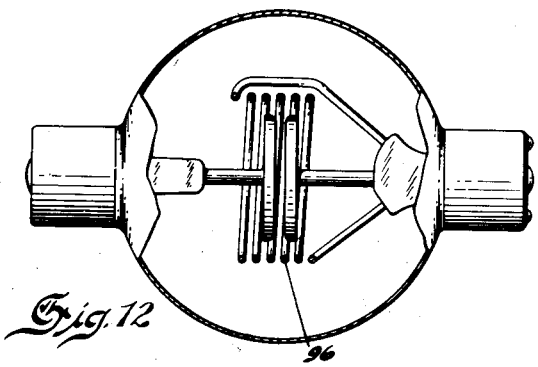
Figure 12 shows an alternative form of tube that may be employed.

In Figure 12 there is illustrated a modified form of electric valve in which provision is made for heating the electrodes. This may be accomplished by surrounding them by heating coil 96 supplied with current from a suitable battery. While this expedient may be desirable under some conditions our experience has indicated that the application of heat tends to cause the arc discharge in the valve to persist instead of dying out between impulses from the generator, and hence destroys the timing.

Figure 13:
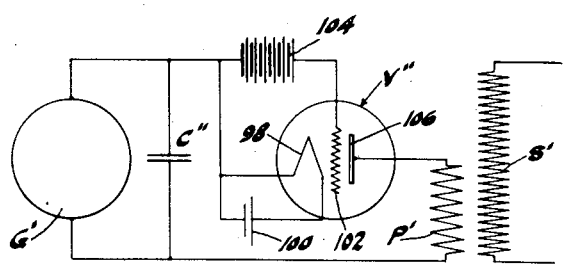
Figure 13 shows a modified circuit employing a three electrode tube and a direct current generator.

In Figure 13 there is shown a modified form of circuit employing a three electrode valve V'' together with a direct current generator G'. The valve may be of the well known type consisting of a filament 98 heated by means of a battery 100, a grid 102 biased by means of B battery 104 and a plate 106 connected to primary P' of the transformer. The grid 102 prevents flow of current through the valve until the charge on the condenser C'' has reached the desired voltage. The secondary S' will, of course, supply energy to the distributor and plugs not shown. A circuit breaker may be employed with this circuit as in Fig. 10 if desired.

We claim:

1. A combination of a generator adapted to produce a peaked voltage wave, a condenser in parallel with the generator adapted to receive and store electrical energy developed by the generator, and a discharge circuit for the condenser comprising an electric valve adapted to normally prevent flow of current through the discharge circuit but to break down upon application of a predetermined generated voltage and permit flow of current therethrough, and a work circuit coupled to the discharge circuit.

2. The combination of a generator adapted to produce a peaked voltage wave, a condenser in parallel with the generator adapted to receive and store electrical energy developed by the generator, a discharge circuit for the condenser comprising an electric valve adapted to normally prevent flow of current through the discharge circuit but to break down upon application of a predetermined generated voltage and permit flow of current therethrough, a step up transformer having its primary arranged in said circuit in series with said valve, and a work circuit including the secondary of said transformer adapted to be intermittently energized upon break down of said valve.

3. In an ignition system, the combination of a generator adapted to produce a peaked voltage wave, a condenser in parallel with the generator, a discharge circuit for the condenser comprising an electric valve adapted to normally prevent flow of current through the discharge circuit but to break down upon application of a predetermined generated voltage thereto and permit flow of current therethrough, and a sparking circuit coupled to the discharge circuit.

4. In an ignition system, the combination of a generator adapted to produce a peaked voltage wave, a condenser in parallel with the generator, a discharge circuit for the condenser comprising an electric valve adapted to normally prevent flow of current through the discharge circuit but to break down upon application of a predetermined generated voltage thereto and permit flow of current therethrough, and a sparking circuit coupled to the discharge circuit, said sparking circuit comprising a plurality of spark plugs and a distributor for connecting the plugs in the circuit.

5. In an ignition system, the combination of a generator adapted to produce a peaked voltage wave, a condenser in parallel with the generator, a discharge circuit for the condenser comprising an electric valve adapted to normally prevent flow of current through the discharge circuit but to break down upon application of a predetermined generated voltage thereto and permit flow of current therethrough, a step-up transformer having its primary arranged in said circuit in series with said valve, and a sparking device in series with the secondary.

6. In an ignition system, the combination of a generator adapted to produce a peaked voltage wave, a condenser in parallel with the generator, a discharge circuit for the condenser comprising an electric valve adapted to normally prevent flow of current through the discharge circuit but to break down upon application of a predetermined generated voltage thereto and permit flow of current therethrough, a step-up transformer having its primary arranged in said circuit in series with said valve, and a sparking circuit including said secondary, a plurality of spark plugs and a distributor for connecting said plugs with said secondary.

7. In an ignition system, the combination of an alternating current generator, a condenser in parallel with the generator adapted to receive and store electrical energy developed by the generator, and a discharge circuit for the condenser comprising an electrical valve adapted to normally prevent flow of current through the discharge circuit but to break down upon application of a predetermined generated voltage upon each alternation and permit flow of current therethrough, and a circuit coupled to the discharge circuit and including an igniting device.

8. In an ignition system the combination of an alternating current generator, a condenser in parallel with the generator adapted to receive and store electrical energy developed by the generator, and a discharge circuit for the condenser comprising an electrical valve adapted to normally prevent flow of current through the discharge circuit but to break down upon application of a predetermined generated voltage upon each alternation and permit flow of current therethrough, a circuit including an igniting device, and a step-up inductive coupling between said circuits providing a higher voltage for the igniting device.

9. In an ignition system the combination of a generator adapted to produce a peaked voltage wave, a condenser connected across the terminals of the generator so as to be charged thereby, a discharge circuit for the condenser including a gaseous discharge tube having electrodes between which current passes when the charge on the condenser reaches the breakdown voltage of the tube, and a circuit including an igniting device coupled to the discharge circuit.

10. In an ignition system the combination of a generator adapted to produce a peaked voltage wave, a condenser connected across the terminals of the generator so as to be charged thereby, a discharge circuit including the condenser and in series therewith the primary of a step-up transformer and a gaseous discharge tube having a plurality of electrodes between which current passes when the charge on the condenser reaches the breakdown voltage of the tube, an igniting device, the secondary of the transformer being connected to supply current to the igniting device.

11. In an ignition system the combination of a device for receiving a charge of electrical energy and rapidly releasing the same, a magneto connected to the device for charging the same, a discharge circuit including the device and a gaseous discharge tube having electrodes between which current passes when the charge on the device reaches the breakdown voltage of the tube, and an ignition circuit inductively coupled to the discharge circuit.

12. In an ignition system the combination of a device for receiving a charge of electrical energy and rapidly releasing the same, a generator adapted to produce a peaked voltage wave connected to the device for charging the same, a discharge circuit including the device and a gaseous discharge tube having electrodes between which current passes when the charge on the device reaches the breakdown voltage of the tube, and an ignition circuit coupled to the discharge circuit.

13. In an ignition system the combination of a device for receiving a charge of electrical energy and rapidly releasing the same, a magneto adapted to produce a peaked voltage wave connected to the device for charging the same, a discharge circuit including the device, and in series therewith the primary of a step-up transformer, and a gaseous discharge tube having electrodes between which current passes when the charge on the device reaches the breakdown voltage of the tube, an igniting device, the secondary of the transformer being connected to supply current to the igniting device.

14. In an ignition system the combination of a condenser, a magneto adapted to produce a peaked voltage wave, connected to the terminals of the condenser to charge the same, a discharge circuit for the condenser comprising the primary of a step-up transformer and a gaseous discharge tube having electrodes between which current passes when the charge on the device reaches the breakdown voltage of the tube, spark plugs, and a distributor adapted to connect the secondary of the transformer to the plugs in succession.

15. The combination with an internal combustion engine of a generator adapted to produce a peaked voltage wave driven by the engine in timed relation, a condenser connected to the generator to be charged thereby, and a discharge circuit for the condenser comprising a gaseous arc discharge tube having electrodes between which current passes when the charge on the condenser reaches the breakdown voltage of the tube, an igniting device for the engine and a circuit for supplying current to the igniting device coupled to the condenser discharge circuit.

16. The combination with an internal combustion engine of a generator adapted to produce a peaked voltage wave driven by the engine in timed relation, a condenser connected to the generator to be charged thereby, and a discharge circuit for the condenser comprising the primary of a step-up transformer and an arc discharge tube having electrodes between which current passes when the charge on the condenser reaches the breakdown voltage of the tube, and a spark plug in series with the secondary of said transformer.

17. The combination with an internal combustion engine of a generator adapted to produce a peaked voltage wave, driven by the engine in timed relation, a condenser connected to the generator to be charged thereby, and a discharge circuit for the condenser comprising the primary of a step-up transformer and an arc discharge tube having electrodes between which current passes when the charge on the condenser reaches the breakdown voltage of the tube, spark plugs, and a distributor connected to the plugs and to the secondary of the transformer to produce discharge at the plugs in succession.

18. In a high frequency ignition system the combination of a condenser, a generator adapted to produce a peaked voltage wave connected to the condenser for charging the same, a discharge circuit for the condenser including the primary of a step-up transformer and a discharge tube containing inert gas at sufficient pressure to permit substantial flow of current, said tube having electrodes between which the current passes when the charge on the condenser reaches the breakdown voltage of the tube, one of said electrodes containing material of low work function to reduce the breakdown voltage, and a work circuit including the secondary of said transformer and an igniting device.

DONALD W. RANDOLPH.
HECTOR RABEZZANA.

CERTIFICATE OF CORRECTION.

Patent No. 2,071,573.

February 23, 1937.

DONALD W. RANDOLPH, ET AL.

It is hereby certified that error appears in the printed specification of the above numbered patent requiring correction as follows: Page 5, first column, line 49, claim 11, for the word "changing" read charging; and that the said Letters Patent should be read with this correction therein that the same may conform to the record of the case in the Patent Office.

Signed and sealed this 30th day of March, A. D. 1937.

(Seal)

Henry Van Arsdale
Acting Commissioner of Patents.